United States Patent
Dutka et al.

[19]

[11] Patent Number: 5,918,255
[45] Date of Patent: Jun. 29, 1999

[54] METHOD FOR TESTING MOTOR ARMATURE SHAFTS

[75] Inventors: Harry F. Dutka, Taylor; Hongling Kang, Livonia; Rick A. Scherer, Canton, all of Mich.

[73] Assignee: UT Automotive Dearborn, Inc., Dearborn, Mich.

[21] Appl. No.: 08/904,684

[22] Filed: Aug. 1, 1997

[51] Int. Cl.⁶ ..................................................... B21D 7/00
[52] U.S. Cl. ............................... 73/1.84; 73/788; 73/849; 73/854
[58] Field of Search .................................... 73/1.79, 1.82, 73/1.84, 66, 116, 459, 460, 477, 478, 487, 573, 581, 663, 788, 812, 819, 849, 854, 856

[56] References Cited

U.S. PATENT DOCUMENTS

| | | |
|---|---|---|
| 4,455,511 | 6/1984 | Stewart, Sr. . |
| 4,660,419 | 4/1987 | Derkacs et al. ............................ 73/622 |
| 4,763,533 | 8/1988 | Uitermarkt ............................ 73/862.35 |
| 4,821,579 | 4/1989 | Gernhart et al. ............................ 73/834 |
| 4,885,948 | 12/1989 | Thrasher, Jr. et al. . |
| 4,912,834 | 4/1990 | Watanabe et al. ............................ 73/66 |
| 5,046,361 | 9/1991 | Sandstrom . |
| 5,089,736 | 2/1992 | Oyafuso ................................... 310/90 |
| 5,144,738 | 9/1992 | Oyafuso ................................... 29/596 |
| 5,199,992 | 4/1993 | Hines et al. ............................ 118/669 |
| 5,359,885 | 11/1994 | Ohms ........................................ 73/146 |
| 5,428,979 | 7/1995 | Knipp et al. ............................... 73/460 |
| 5,448,917 | 9/1995 | Maciejewski .............................. 73/812 |
| 5,591,921 | 1/1997 | Schaede .................................... 73/849 |

*Primary Examiner*—George Dombroske
*Assistant Examiner*—Eric S. McCall
*Attorney, Agent, or Firm*—Howard & Howard

[57] ABSTRACT

A method for testing motor armature shafts is disclosed. The method includes simulating armature shaft loading conditions to test armature shaft reliability for failure. The shaft has a longitudinally extending axis, which during operation is the axis of rotation of the shaft. In the method the shaft is fixedly supported at two spaced locations a predetermined distance from one of the free ends. A normal force is rotated about the shaft's longitudinal axis. This force is exerted continuously about the circumference of the free end of the armature shaft, so that the armature shaft is continuously offset a predetermined distance from its longitudinal axis. This force is continuously applied for a predetermined number of rotations of the shaft. This simulates loading of the armature shaft in an assembled motor.

6 Claims, 2 Drawing Sheets

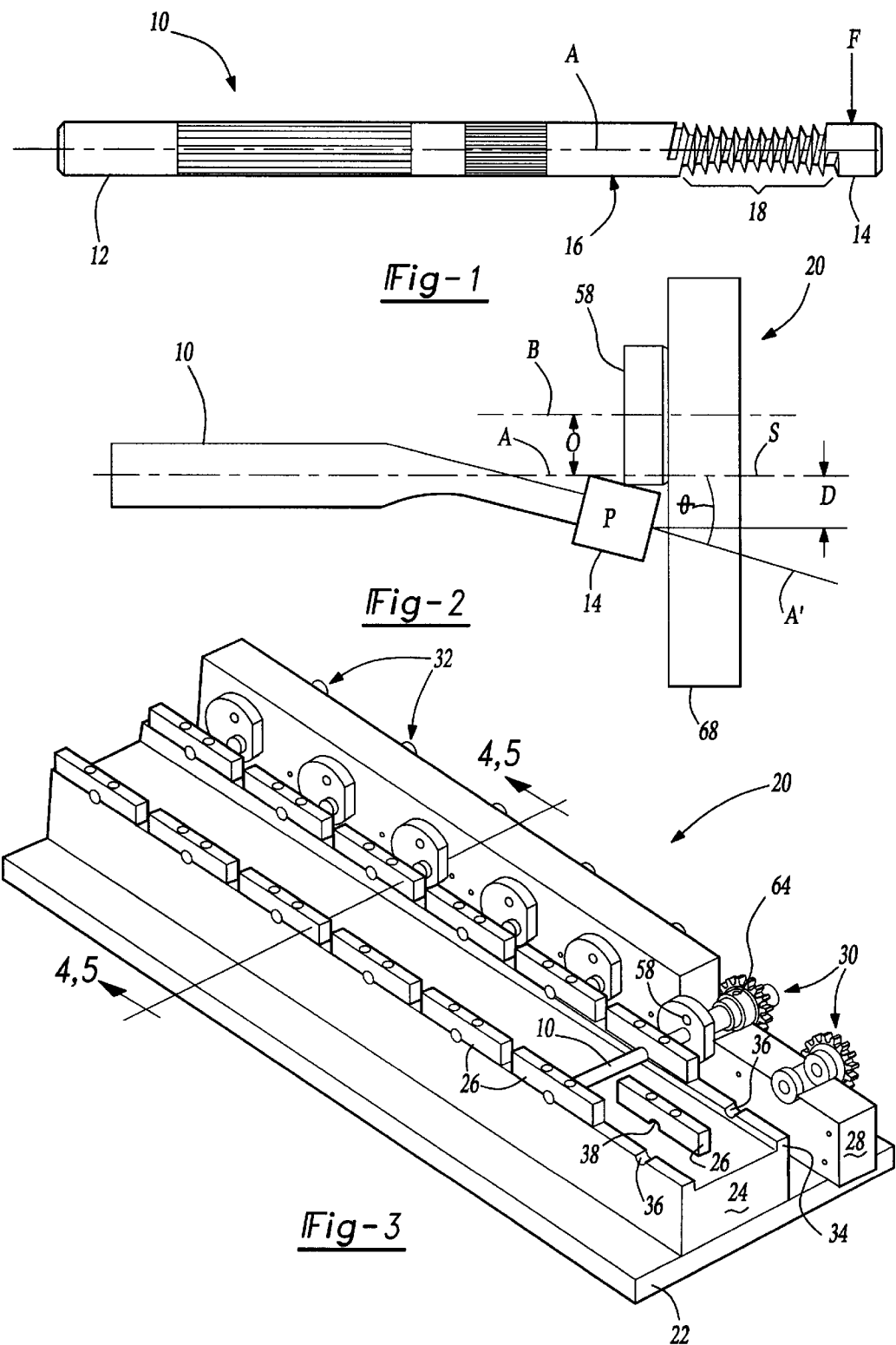

METHOD FOR TESTING MOTOR ARMATURE SHAFTS

TECHNICAL FIELD

The present invention relates to motors, and more particularly to method for testing motor armature shafts.

BACKGROUND OF THE INVENTION

Electric motors may be used to drive gears to achieve actuation, or mechanical displacement, as in automotive window lift mechanisms. Some motors include an armature shaft with a worm drive section. This shaft rotates and drives worm gears. In any application it is necessary that the gears be driven reliably and with minimal vibration and noise. During use armature shafts may break undesirably under load when the worm drive section engages the gears. Since reliability is a key requirement for a motor, there is a desire for reliability testing of various designs to determine if they will satisfy cycle life requirements prior to breakage of the armature shaft.

Typically this testing is done by running assembled motors under various conditions. However, this method is problematic. Since the motor requires dynamic time as well as dwell time during testing, the testing is time consuming and cannot be accelerated. Furthermore, the test results can be difficult to interpret due to variations between motors. In addition, using complete motors requires assembly of the motor which is time consuming.

SUMMARY

The present invention is predicated in part on the recognition that in order to simulate the loading of a motor armature shaft by a gear the typically revolving armature shaft must not revolve during testing.

According to an embodiment of the present invention, a method for testing an armature shaft of a motor is disclosed. The shaft has a longitudinally extending axis, which during operation is the axis of rotation of the shaft. The method comprises the following steps. The shaft is fixedly supported at two spaced locations a predetermined distance from one of the free ends. A normal force is rotated about the shaft's longitudinal axis. This force is exerted continuously about the circumference of the free end of the armature shaft, so that the armature shaft is continuously offset a predetermined distance from its longitudinal axis. This force is continuously applied for a predetermined number of rotations of the shaft. In this way, the free end of the shaft is loaded as if it were in a motor interfacing with a gear.

According to an embodiment of the present invention, an apparatus for performing the testing method which includes a first, second and third element. The first element fixedly supports the shaft. The second element rotates, and has a first rotational axis which is coaxial with the longitudinal axis of the shaft. The third element is rotatably attached to the second element and applies the force to the end of the shaft.

The foregoing invention will become more apparent in the following detailed description of the best mode for carrying out the invention and in the accompanying drawings.

BRIEF DESCRIPTION OF THE DRAWING

FIG. 1 is a front view of an armature shaft for use in a testing apparatus of the present invention.

FIG. 2 is a schematic front view of a portion of the testing apparatus in operation.

FIG. 3 is a partial perspective view of the testing apparatus of the present invention with portions broken away for clarity.

BEST MODE FOR CARRYING OUT AN EMBODIMENT THE INVENTION

Figure 4:
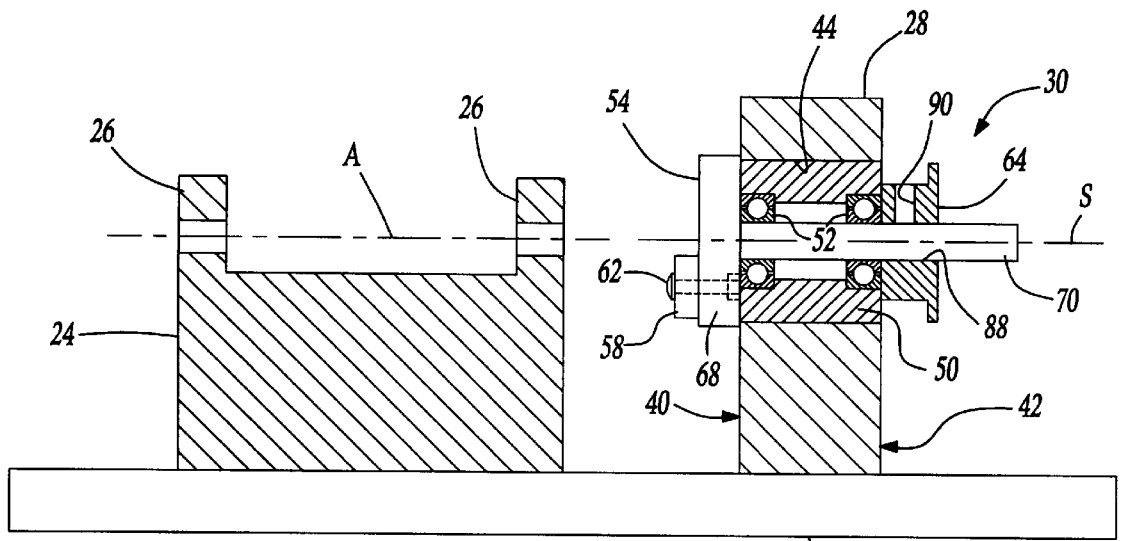
FIG. 4 is a cross-sectional view along line 4–4 of FIG. 3 of the testing apparatus

Referring to FIG. 1, an armature shaft 10 for use in a direct current motor (not shown) is substantially cylindrical and includes two journaled free ends 12 and 14, and an intermediate journaled portion 16 between the free ends 12 and 14. It should be understood, when shaft 10 is mounted in a motor, the ends 12 and 14 will be supported in bearings. When the armature shaft is supported within the motor, bearings (not shown) support the armature shaft 10 at the journals 12 and 16.

The armature shaft 10 further includes a worm drive section 18, and a longitudinally extending axis A about which the armature shaft rotates. The worm drive section 18 meshes with a worm gear (not shown) to translate the rotation of the armature shaft 10 into gear rotation.

In order to develop a testing apparatus 20 (as shown in FIG. 3), the loading conditions during operation of the armature shaft must be predicted and simulated. Finite Element Analysis was used to determine the loading conditions of the armature shaft of a window lift motor during use. It was determined that the loading conditions that cause breakage in the worm area are a force normal to the armature shaft axis A applied at the journal end 14, and rotation of the armature shaft. The normal force is represented by the arrow F. The force causes the journal end 14 of the shaft to be displaced. The testing apparatus must simulate this displacement, and the armature shaft rotation. In order to increase reliability of the test the armature shaft is not rotated, but loaded as if it is rotated.

Referring to FIG. 2, the test apparatus 20 simulates the loading conditions by applying a perpetual, eccentric displacement D as measured from the armature shaft axis A at the armature shaft journal end 14. This displacement causes the armature shaft journal end 14 to orbit about the armature shaft axis A at an angular displacement φ as measured from the armature shaft loaded axis A'. The distance of the eccentric displacement necessary is also determined by Finite Element Analysis.

Referring to FIG. 3, the testing apparatus for the armature shaft 10 includes a base plate 22, an armature shaft support block 24, a plurality of fastening blocks 26, a drive assembly support block 28, and a plurality of drive assemblies 30. In this embodiment, the test apparatus 20 is designed to test seven armature shafts simultaneously using seven longitudinally spaced test stations 32.

The base plate 22 supports the armature shaft support block 24 and the drive assembly support block 28. The base plate 22 is precision machined from aluminum. Each of the blocks are fastened to the base plate using conventional fasteners such as dowels and cap screws.

The armature shaft support block 24 is substantially U-shaped and has two upwardly extending spaced side walls 34. The side walls 34 contain a pair of transversely extending grooves 36 in the upper surface for receiving the journals 12 and 16 (as shown in FIG. 1) of the armature shaft 10. At each testing station 32 a pair of grooves 36 are present. In this embodiment, the armature shaft support block is precision machined from 4140 steel.

Each fastening block 26 is substantially box-shaped and includes a transversely extending groove 38 in the lower surface. Each fastening block is for clamping the armature shaft within the grooves 36, 38 at the journals 12 and 16. The dimensions of the grooves 36 and 38 are precision machined into the armature shaft support block 24 and the fastening blocks 26 to maintain a datum relationship to be discussed below. The inner diameter of the grooves 36 and 38 is substantially equal to the outer diameter of the armature shaft within ±0.0002 inches. The fastening blocks 26 are guided by dowels (not shown) into holes (not shown) in the armature shaft support block 24. The dowels have tolerances with enough slip fit so that they would not interfere with the groove surfaces. The fastening blocks 26 and the armature shaft support block 24 are adapted to be releasably attached using conventional fasteners such as cap screws and dowels. The clamping of the armature shaft by the fastening blocks at each journal 12 and 16 simulates the clamping of the armature shaft by the motor bearings (not shown). The clamping of the armature shaft is stable enough so that all of the eccentric displacement D (as shown in FIG. 2) will occur only at the journal end 14, not between the journals 12 and 16. Residual deflection between the journals 12 and 16 could decrease reliability of the test results.

Referring to FIG. 3, the drive assembly support block 28 is substantially rectangular and supports the drive assembly 30. The drive assembly support block has a first face 40 adjacent the armature shaft support block 24, a second face 42 opposed thereto, and bores 44 at the longitudinally spaced locations (i.e, the test stations 32). Each bore 44 extends between the faces 40 and 42 of the drive assembly support block 28. The bearing support block is precision machined from aluminum.

Figure 5:
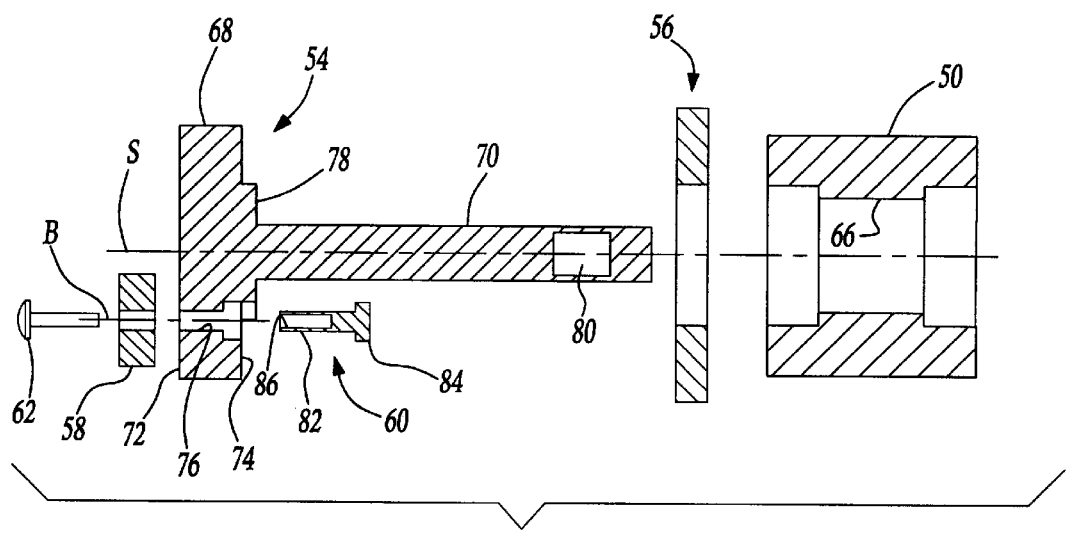
FIG. 5 is an exploded view cross-sectional view along line 5–5 of FIG. 3 of a portion of the drive assembly for use in the testing apparatus in FIG. 3.

Referring to FIGS. 4–5, one drive assembly 30 is disposed within each of the bores 44 in the drive assembly support block 28. Each drive assembly includes a bushing 50, two ball bearings 52, a drive spindle 54, needle bearing 56, a drive bearing 58, a precision post 60, a fastener 62, a sprocket 64, chain (not shown), and a power source (not shown).

The bushing 50 should be ground within a diameter of 0.0001 inches, so that its outer diameter is approximately equal to but slightly smaller than the inner diameter of the bore (ranges 0.00005 inches to 0.0001 inches clearance) such that the bushing can be slip fit no shake into each bore 44 in the drive assembly support block 28. Each bushing 50 includes a central passage 66 with a larger diameter at the ends than at the center. The larger diameter ends of the central passage 66 is precision counter bored so that they are concentric. The bearing bushings 50 are formed from steel, hardened and precision ground over all of the features of each detail. Each of the ball bearings 52 are slip fit into the ends of the central passage 66. The ball bearings 52 used are commercially available from Fafner and are manufactured under the part number Fafner S5PP.

The drive spindle 54 includes a disk 68, an integrally formed shaft 70, and an axis of rotation S. The disk 68 has a first face 72 and a second face 74. The shaft 70 extends from the second face 74 of the disk 68.

The disk 68 includes a precision ground bore 76 and a shoulder 78. Bore 76 extends from the first face 72 to the second face 74. The shoulder 78 extends from the second face 74 of the disk.

The shaft 70 is substantially cylindrical and includes a flattened portion 80 near the free end. The spindle is ground to fit precisely into the inner races of the ball bearings 52. It is critical to the successful simulation of the loading conditions that all of the elements be machined so that during operation the spindle axis of rotation S and the armature shaft axis A are coaxial (as shown in FIGS. 2 and 4)

The needle bearing 56 counters any axial thrust force, and any friction between the spindle disk 68 and the bearing bushing 50 during operation. The needle bearing 56 has a ring shape which slip fits on the disk shoulder 78. The needle bearing used is commercially available from Torrington.

The drive bearing 58 is rotatably attached to the first face 72 of the spindle disk 68. The drive bearing 58 is commercially available from NSK under the part number 626C221MC3E. The drive bearing has an axis of rotation B. The offset O between the axis of the drive bearing and the armature shaft and spindle axises A and S is such that when the drive bearing contacts the armature shaft 10 at the point P the necessary eccentric displacement D is produced, so that the loading conditions are simulated. The drive bearing exerts the force F on the armature shaft and simulates rotation of the armature shaft by rotation about the armature shaft axis A. The test apparatus is designed to exert the force at the point P of the armature shaft so that the test system would not bind up during use. However, the apparatus is designed so that the force at the point P yields the necessary eccentric displacement at the journal 14 tip.

The precision post 60 includes a cylindrical post 82 and a mounting face 84. The cylindrical post 82 includes a threaded longitudinally extending bore 86. The precision post should be precision ground so that the outside diameter will be in a slip no shake fit with the bore 76.

The fastener 62 is a cap screw which tightens in the direction of the spindle axis B.

The sprocket 64 includes a central bore 88 for receiving the spindle shaft 70, and a radially extending bore 90 communicating with the central bore 88. All of the sprockets 64 are connected with a sprocket chain (not shown) and driven by a fractional horse power DC motor (not shown). All of which are commercially available.

Assembly of the testing apparatus 20 will now be discussed, with reference to FIGS. 3–5. It is critical that the dimensions of the components of the apparatus be machined and assembled so that there is substantially no variance except along the armature shaft and spindle axises A and S. First, the armature shaft support block 24 and drive assembly support block 28 are positioned on the base plate 22 in the proper location, so that they are parallel and spaced appropriately. Then the blocks 24 and 28 are fastened to the base plate 22. Each of the bushings 50 are placed within the associated block bores 44. The ball bearings 52 are disposed in either end of the bushing 50. The precision post 60 is disposed thorough the bore 76 in the spindle disk 68 so that the post face 84 is adjacent the disk second face 74. The drive bearing 58 is disposed over the precision post 60 that extends through the disk 68, and attached there to by tightening the fastener 62 into the bore 86 of the post 60. Thus the drive bearing is rotatably secured to the spindle 54. The spindle shaft is disposed through the needle bearing 56 and the needle bearing 56 rests on the shoulder 78. The spindle shaft 70 is then disposed through the ball bearings 52. The sprocket 64 is inserted over the spindle shaft 70. A fastener (not shown), such as a set screw, is disposed through the radial bore 88 and tightened against the spindle flat portion 80 to fixedly secure the sprocket 64 to the spindle 54.

Use of the testing apparatus 20 will now be discussed with reference to FIGS. 2–4. The fastening blocks 26 are removed, so that the grooves 38 in the armature shaft support block 24 are accessible. An armature shaft 10 is disposed within the grooves 36 at each test station 32. The armature shafts 10 are supported by the grooves 36 at the end and intermediate journals 12 and 16 respectively (as shown in FIG. 1). The armature shaft end journal 14 engages the drive spindle 58 (as shown in FIG. 5). Each of the fastening blocks 26 are attached to the armature shaft support block 24 so that each armature shaft 10 is received between the grooves 36 and 38. The fastening blocks 26 are tightly secured thereto so that they clamp the armature shafts 10 in place.

Each drive bearing 58 exerts the force F (as shown in FIG. 1) on each the armature shafts 10, so that the tip of the armature shaft is deflected the angle $\phi$ and the eccentric displacement D is established at the tip. Once each sprocket 64 is connected to the power source (not shown) through the chain (not shown), the chain caused each sprocket 64 to rotate. In turn, the sprockets 64 cause their associated spindle 54 to rotate within the bushing ball bearings 52. The engagement of each drive bearing 58 with each armature shaft causes each and of the drive bearings to rotate about it armature shaft 10 as long as the spindle rotates causing the armature shaft to be eccentrically displaced and loaded as if within an actual motor. This set up is designed to fracture the armature shaft between the journals 16 and 14.

The principle advantage of the present invention is that it allows testing of armature shafts in a more time effective and efficient manner than previous methods. The testing apparatus also allows accelerated testing due to using an apparatus that does not require build up of an entire motor for testing. Furthermore seven armature shafts can be tested at a time.

An additional advantage is that the testing done with the apparatus of the present invention allows for more accurate results because variance of variables is minimized by precise machining, design of the apparatus, and keeping the armature shaft stationary during testing.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include, but are not limited to, modifying the type of bearings used, modifying the number of test stations used either increasing or decreasing them. In addition the testing apparatus may be modified to similarly test the armature shafts of other motors, such as fractional DC motors used for wipers and any other geared applications. It is therefore contemplated that the appended claims will cover any such modification or embodiments that fall within the true scope of the invention.

We claim:

1. A method for testing an armature shaft of a motor, said shaft having a longitudinally extending axis, said method comprising the steps of:

fixedly supporting the armature shaft at two spaced locations a predetermined distance from one of two free ends;

rotating a rotatable member in contrast with said shaft to provide a normal force about the axis of the armature shaft about said one free end of the armature shaft, so that the armature shaft is continuously offset a predetermined distance from said longitudinal axis; and continuing to apply said force for a predetermined number of rotations of said rotatable member.

2. The method for testing of claim 1, wherein said method further comprises the steps of:

providing a rotatable spindle as said rotatable member, and having a rotatable bearing disposed thereon and a spindle longitudinal axis, said spindle being supported such that said spindle longitudinal axis is coaxially aligned with said shaft axis, and upon rotation of said spindle said bearing engages said one free end of the armature shaft and applies said force normal to the axis of the shaft continuously about the circumference of the free end of the armature shaft, so that the armature shaft is continuously offset a predetermined distance from said longitudinal axis.

3. An apparatus for testing an armature shaft, said shaft having a longitudinally extending axis; said apparatus comprising:

a first element for fixedly supporting the armature shaft at two spaced locations along said longitudinal axis;

a rotatable second element spaced from the first element, said second element rotating about a first axis of rotation; said second element being supported such that said first axis of rotation is coaxially aligned with said longitudinal axis; and a third element rotatably attached to the second element for rotating about a second axis of rotation offset from the first axis of rotation, said third element contacting a free end of said shaft and upon rotation of said second element said third element rotates about said free end and applies a constant force normal to the longitudinal axis about the circumference of said free end of the armature shaft, so that the armature shaft is continuously offset a predetermined distance from said longitudinal axis.

4. The apparatus of claim 3, wherein said second element is a block including a bore for receiving a spindle, said spindle including a disk, said disk including a first face and an opposed second face, said second element further including an integrally formed shaft extending from said second face of said disk.

5. The apparatus of claim 4, wherein said second element further includes a bushing bearing for supporting said spindle shaft within said bore said bushing bearing having a central passage with a larger diameter at each end, each end receives ball bearings.

6. The apparatus of claim 5, wherein said third element is a drive bearing rotatably attached to said first face of said spindle.

\* \* \* \* \*